United States Patent [19]
Rubin

[11] 3,990,145
[45] Nov. 9, 1976

[54] RAKE AND HAND SHIELD FOR HEDGE TRIMMERS

[76] Inventor: Francis S. Rubin, 2729 N. Charles St., Baltimore, Md. 21218

[22] Filed: June 25, 1975

[21] Appl. No.: 590,021

[52] U.S. Cl. .................................. 30/132; 30/233
[51] Int. Cl.² .................................... B26B 19/48
[58] Field of Search ............ 30/209, 210, 233, 132, 30/131; 56/17.4, DIG. 24

[56] References Cited
UNITED STATES PATENTS

| | | | |
|---|---|---|---|
| 2,617,189 | 11/1952 | Brown | 30/233 X |
| 3,073,025 | 1/1963 | Yatsko | 30/132 |
| 3,552,013 | 1/1971 | Stone | 30/132 |
| 3,795,050 | 3/1974 | Latsha | 30/132 |

*Primary Examiner*—Al Lawrence Smith
*Assistant Examiner*—J. C. Peters
*Attorney, Agent, or Firm*—J. Wesley Everett

[57] ABSTRACT

The present structure relates to portable electrically operated hedge trimmers of the type having an elongated blade assembly, including at least one stationary cutter blade and at least one cooperating reciprocating cutter blade supported and guided by the blade assembly, having means for operating the reciprocating blade, and an assembly for supporting the blade operating means and the blade assembly, including a handle positioned on the assembly supporting the operating means between the cutter blades and the said operating means, a raking element secured along the upper side of the blade assembly having a safety shield positioned on the rake portion between the blades and the operating means for shielding the hands of the operator from the cutter blades.

11 Claims, 9 Drawing Figures

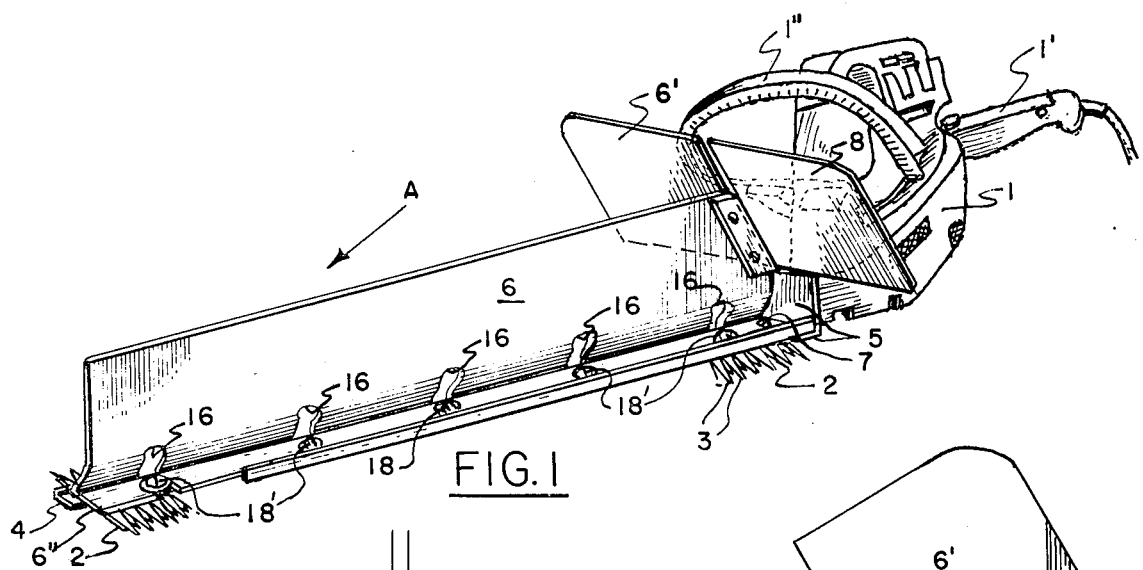
FIG. 1
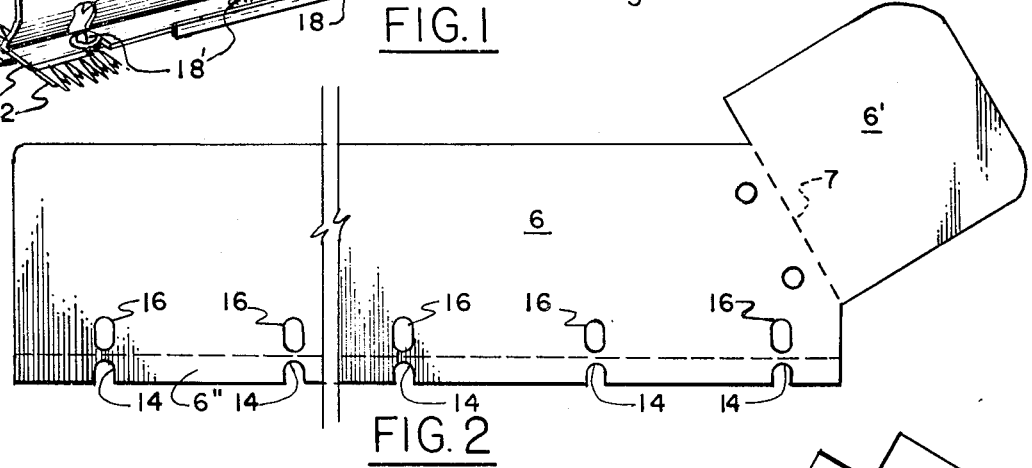
FIG. 2
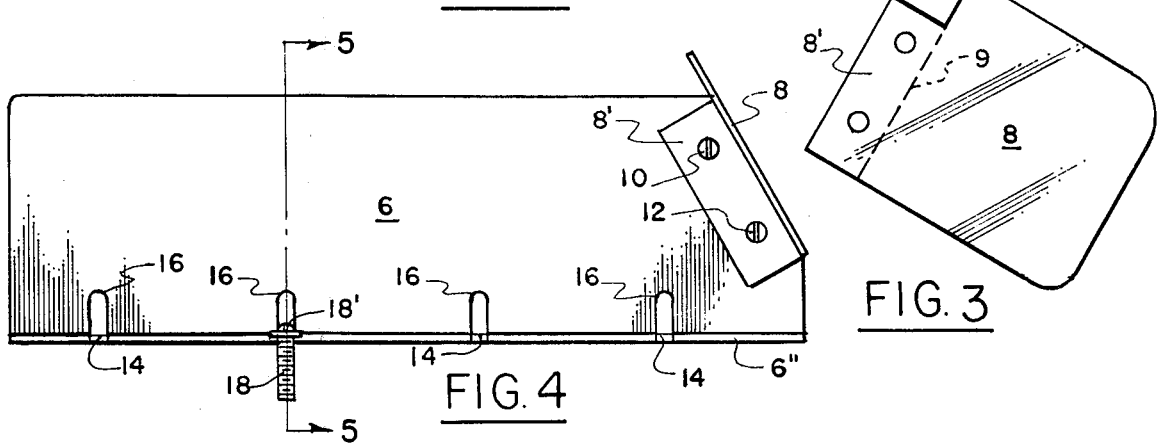
FIG. 3
FIG. 4
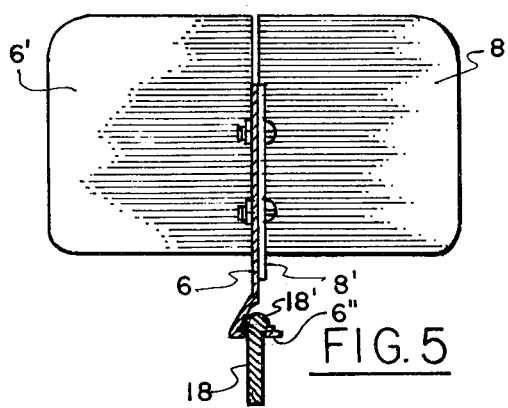
FIG. 5

RAKE AND HAND SHIELD FOR HEDGE TRIMMERS

This invention relates to a portable electric hedge trimmer and more particularly to a rake therefore and a safety shield carried by the rake for protection against accidental injury to the hands of the operator.

In the past, some hedge trimmers have been provided with cradles that caught the clipped foliage, but these are too heavy when filled with the collected clipping, making their use impractical.

The present rake is designed to sweep off the clippings while trimming the top of a hedge which otherwise would need to be removed by some other means and frequently by the operator using one of his or her hands for this purpose.

One object of the invention is to provide a rake and safety shield that is readily attachable to or detachable from a hedge trimmer.

Another object of the invention is to provide a rake and safety shield of a minimum number of parts.

A further object of the invention is to provide a foliage rake and safety shield that is adapted to use on either a single or double edge trimmer.

While several objects of the invention have been set forth, other objects, uses and advantages will become more apparent as the nature of the invention is more fully disclosed in the following detailed description with reference to the accompanying drawings, in which:

FIG. 1 is a view in perspective of the rake an safety shield attached to a cutter blade assembly of a portable electrically operated hedge trimmer.

FIG. 2 is a plan view of a formed blank for constructing the rake portion and at least a portion of the safety shield in combination with the rake.

FIG. 3 is a bottom plan view of another element of the safety shield.

FIG. 4 is a view in elevation of one form of rake and safety shield after it has been formed and ready to be attached to the cutter blade assembly.

FIG. 5 is a sectional view taken on line 5—5 of FIG. 4.

In referring to the drawings like and similar reference characters are used to point out like and similar parts throughout the several views.

Figure 6:
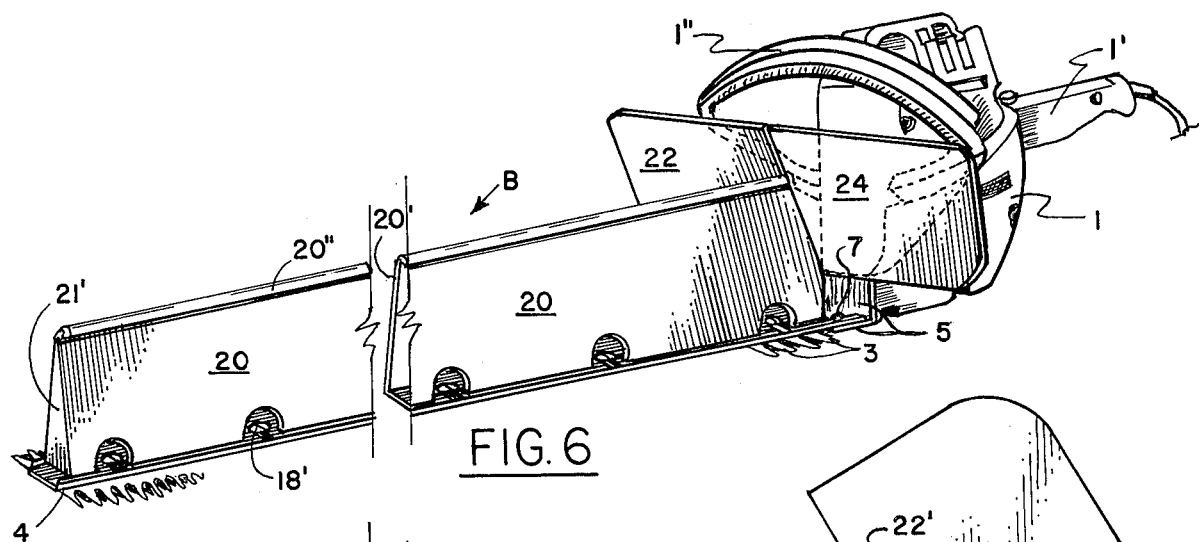
FIG. 6 is a perspective view of a modified form of rake and safety shield attached to a blade assembly of a portable electrically operated hedge trimmer.
Figure 7:
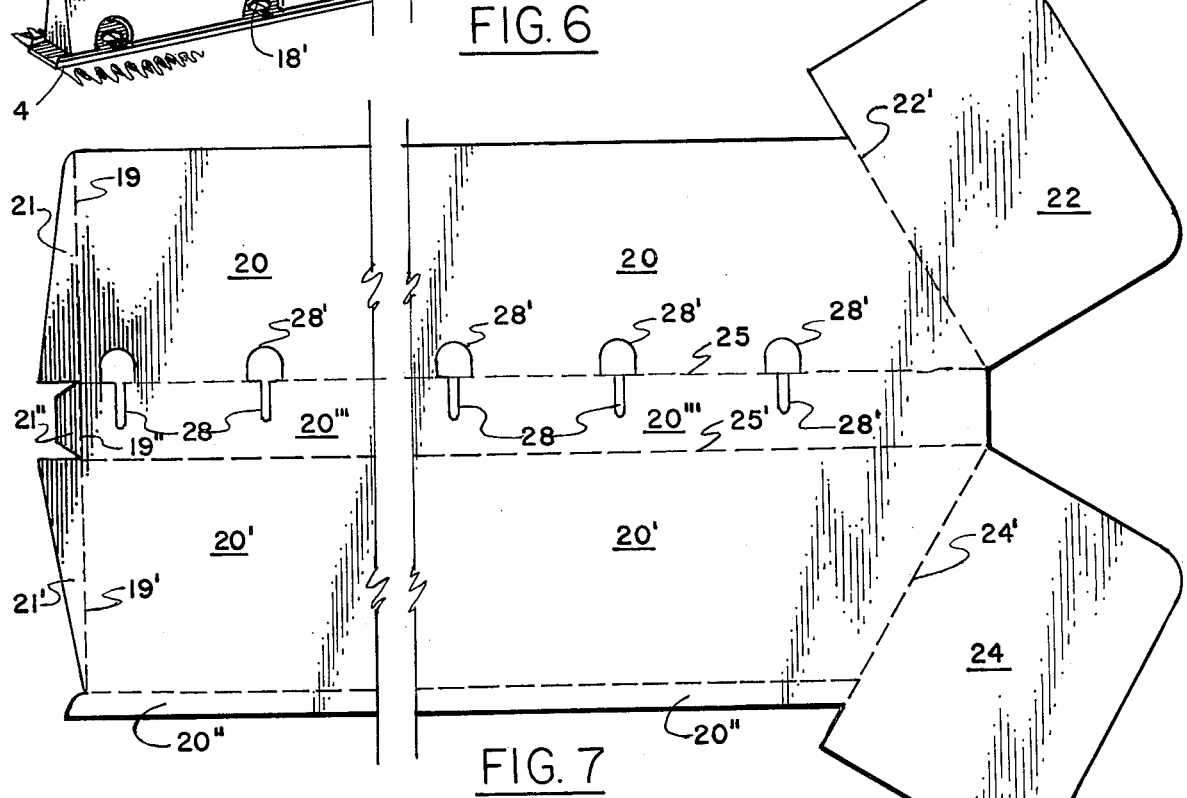
FIG. 7 is a bottom plan view of the blank of the form of rake and safety shield shown in FIG. 6.

In FIG. 1 there is shown a form A of the combination rake and safety shield assemblied and attached to a general type of portable hedge trimmer in which the hedge trimmer is provided with a electrically operated motor (not shown), supported within a housing assembly 1 for operating a reciprocating cutting blade 2 supported upon the stationary blade assembly 4 to which is fixed a stationary blade 3. The housing assembly 1 is supported upon a supporting means 5 for the motor and blade assembly 4. The blade assembly being secured to the supporting means 5 by bolts 7 extending through one end of the blade assembly, as shown in FIGS. 1 and 6. However, the blade assembly may be supported in any convenient manner as taught in the prior art.

The supporting means 5 is also provided with a handle 1' positioned on the side of the assembly opposite the blade assembly 3, and a bail-type handle 1" positioned on the side of the support adjacent the blade assembly. These hedge trimmers are manufactured with both single and double cutter blades, the present illustration shows a hedge trimmer with a double cutter blade. However, the present rake and safety shield are equally installable on both types. A typical type of hedge trimmer is shown in the patent to Jepson, U.S. Pat. No. 2,664,626 — Jan. 5, 1954.

With reference to the form of rake and safety shield shown at A in FIGS. 1 to 5, the rake and a portion of the safety shield are preferably made from a single sheet of light weight material 6 and 6'. A second portion 8 of the safety shield is formed separately, as shown in FIG. 3, and attached to the rake upstanding portion 6 by the bolts 10 and 12.

The lower edge of the blank 6 is slotted, as shown at 14 and 16 for securing the rake along the upper surface of the blade assembly unit 4 by the bolts 18, shown best in FIG. 1. These bolts 18 are normally used to secure the several parts of the blade assembly to each other and are now utilized to secure the rake and safety shield thereto.

The portion 6– of the rake is formed at right angls to the portion 6 in order that the uppermost portion 6 of the rake when secured to the blade assembly will be in a plane substantially perpendicular to the plane of the blade assembly.

The rake and safety shield are generally installed by loosening the screws or bolts 18 holding the several parts of the blade assembly, slipping the bolts 18 into the slots 14 of the portion 6" to engage the edges thereof under the heads 18' of the bolts 18, retightening the bolts thereby clamping the combination rake and safety shield to the blade assembly.

However, if the blade assembly is no equipped with screws or bolts 18 as previously referred to, holes may be made along the blade assembly for inserting suitable bolts to secure the rake and safety shield thereto.

The modified form B of the rake and safety shield is shown in FIGS. 6 to 9.

FIG. 6 shows the modified form of rake and safety shield attached to a double edge portable electric hedge trimmer.

Figures 8, 9:
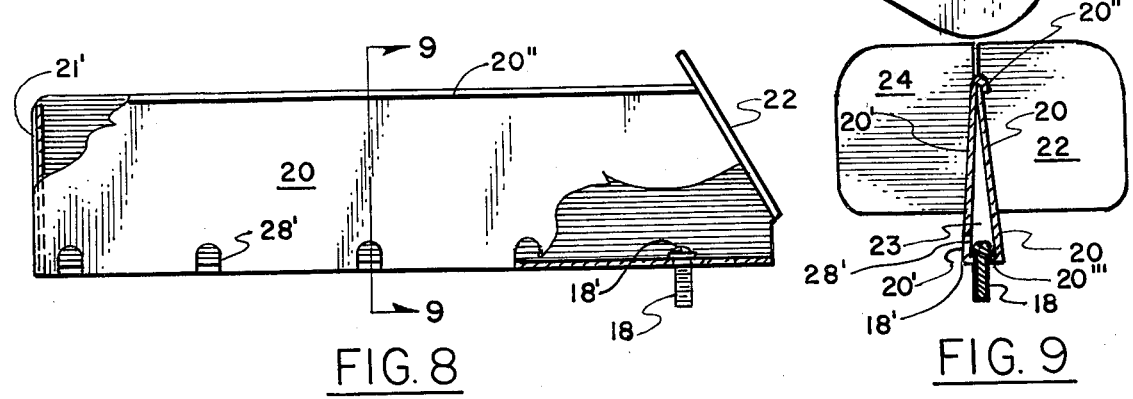
FIG. 8 is a view partly in elevation and partly in section of the modified form of rake and safety shield in finished form and ready to be attached to a blade assembly.
FIG. 9 is a sectional view taken on line 9—9 of FIG. 8.

In this modified form the sheet is shown having sections 20, 20', 20", 20''', 21, 21', 21", 22 and 24, and is blanked out of a much lighter gauge material than when the rake and safety shield are formed from a single sheet. In this modified form the safety shield portions 22 and 24 are formed in the same single stamping as that of the portions 20 and 20' of the rake. The blank sheet is then folded as shown in FIGS. 6 and 9. The sheet 20 and 20' is folded along the lines 25 and 25' to form a two sheet upstanding rake portion and a mounting portion 20'''. The side 20' is made slightly wider than the side 20 in order that the portion 20" may be folded over the upper edge of the portion 20 where it is firmly pressed into contact with the edge of sheet 20, as best shown in FIG. 9, and, if desired, the two edges may be welded.

The members 22 and 24 are bent at right angles to the portions 20 and 20' respectively and are in a plane substantially perpendicular to the outstanding portions 20 and 20'.

The ends of sheet portions 20 and 20' as shown at 21, 21' and 21'' are bent along the lines 19, 19' and 19'', and when bent at right angles along their respective lines will close the end of the opening 23 as shown in FIGS. 6 and 9.

The rake and safety shield of the B form rake and safety shield are supported on the stationary blade assembly by suitable screws or bolts and preferably by the screws and bolts that are normally used in supporting the several elements of the blade assembly, such as bolts 18 referred to hereinbefore for securing the rake and safety shield shown in Form A, FIGS. 1 to 5.

For mounting the form B rake and safety shield slots are formed in the mounting portion 2''' as shown at 28 having an enlarged portion 28'' in the side portion 20 for allowing space for the head 18' of the bolts 18 to pass through the side 20, and also of such size as to admit a screw driver to hold the heads of the bolts if such type is used.

The rake and hand shield are easily formed from not more than two stampings. The rake and hand shield is securable to a portable electric hedge trimmer and normally with the same means that are used in holding the elements of the stationary blade assembly simply by loosening the screws or bolts and slipping the heads of the bolts into the slots 28 and re-tightening the same, which makes for a minimum number of parts.

While only two forms of the invention have been shown and described in detail, it is not intended as a limitation as the scope of the invention is best defined in the appended claims.

I claim:

1. A combination rake and safety shield adapted to be secured to an electrically operated hedge trimmer wherein the hedge trimmer is of the type having an elongated blade assembly including a stationary blade and an associated reciprocal blade, means for operating the reciprocal blade, means for supporting the blade assembly and the blade operating means, and means for securing one end of the blade assembly to the blade assembly support, the rake being formed from substantially light material and of substantially rectangular form, means along one edge of the rake for securing the same to one side of the blade assembly, a safety shield fixed to the end of the rake adjacent the end of the blade assembly fixed to the blade assembly support and perpendicular to the plane of the rake.

2. A combination rake and safety shield adapted to be secured to an electrically operated hedge trimmer wherein the hedge trimmer is constructed of a elongated flat blade assembly including a stationary blade and an associated reciprocal blade, means for operating the reciprocal blade, means for supporting the blade assembly and the blade operating means, and means for securing one end of the blade assembly to the blade assembly support, the combination rake and safety shield being of substantially rectangular form having an upstanding portion formed from a double sheet of thin material, said sheets being spaced apart along one of their elongated edges by a mounting portion extending between their opposite edges and integrally formed therewith and means associated with the mounting portion for securing the rake portion to the blade assembly, the safety shield extending outwardly from at least one side of the rake positioned adjacent the supported end of the blade assembly.

3. In a combination rake and hand shield for a portable electrically operated hedge trimmer as claimed in claim 2 wherein the safety shield is angled upwardly from the mounting side of the upstanding portion of the rake toward the attached edges of the two sheets and toward the opposite end of the rake portion.

4. In a combination rake and shield for a portable electrically operated hedge trimmer as claimed in claim 2 wherein the safety shield extends outwardly from the side of the rake portion to a point at least over the cutting edges of the blades.

5. An improved rake adapted to be secured to an electrically operated hedge trimmer wherein the hedge trimmer is constructed of a blade assembly including a stationary blade and an associated reciprocal blade, means for retaining the reciprocal blade in slidable contact with the stationary blade, the improved rake comprising:
   a. a folded, thin, flat sheet of rectangular form of substantially the same length as the blade assembly;
   b. the sheet being folded along two spaced parallel lines adjacent its center to provide a mounting portion and adapted to be fixedly engaged to one another along their edges opposite the mounting portion and means for securing the mounting portions to the blade assembly in a plane passing through the blade assembly substantially perpendicular to the plane of the slideable surfaces of the said blades.

6. In combination with a portable power operated hedge trimmer unit of a type having an elongated substantially flat blade assembly and a support therefor, means at one end of the blade assembly for attaching the same to the said support, the blade assembly having at least one stationary blade and at least one reciprocal blade operatable in slideable contact with the stationary blade, handle means carried by the support adjacent the end of the support to which the blade assembly is attached for manually supporting and manipulating the trimmer unit, and means for operating said reciprocal blade, a rake extending outwardly from one side of the blade assembly and extending substantially the full length thereof, a small portion of one of the longer edges of the rake being formed at an angle so the remaining portion of the rake to provide a mounting portion for the rake, means for releasably fixing the rake to the side of the blade assembly, said mounting portion being of such an angle to the remaining portion of the rake and of such width as to position the rake in a plane passing through the blade assembly substantially perpendicular to the plane of the slideable surfaces of the blades.

7. A hedge trimmer as claimed in claim 6 wherein the rake is provided with a safety shield fixed to the rake adjacent the end of the blade assembly attached to the blade assembly supporting means.

8. A hedge trimmer as claimed in claim 7 wherein the safety shield is attached to the rake in a plane substantially perpendicular to the lateral sides of the rake.

9. A hedge trimmer as claimed in claim 7 wherein the safety shield extends outwardly from the side of the rake to a plane leading substantially parallel to the rake portion and through the outer ends of the cutting blade.

10. An improved rake adapted to be secured to a power operated hedge trimmer wherein the hedge trimmer is of the type constructed of an elongated flat blade assembly including a stationary blade and an associated reciprocal blade, means for attaching one end of the blade assembly to a support therefor and means for positioning the reciprocal blade in slideable contact with the stationary blade, the improved rake comprising:
- a. a flat sheet of rectangular form of substantially the same length as the blade assembly;
- b. a small portion of one of the longer edges of the sheet being formed at an angle to the remaining portion of the rake forming a mounting portion for the rake;
- c. said mounting portion being of such an angle to the remaining portion of the rake and of such width as to position the rake in a plane passing through the blade assembly substantially perpendicular to the plane of the slideable surfaces of the blades.

11. A rake for a hedge trimmer as claimed in claim 10 wherein the rake is provided with a safety shield fixed to the rake adjacent one end thereof and in a plane substantially perpendicular to the plane of the rake.

* * * * *